Nov. 2, 1937.  M. G. STRUBLE  2,097,478
COOKING UTENSIL
Filed Oct. 5, 1936
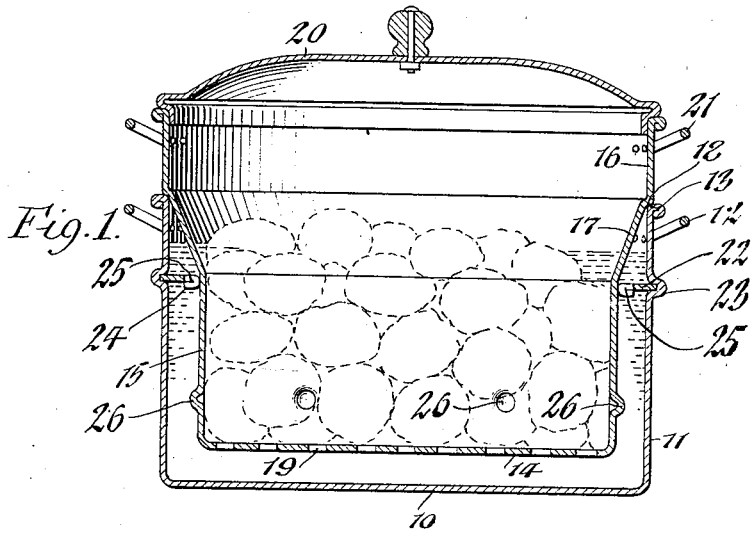
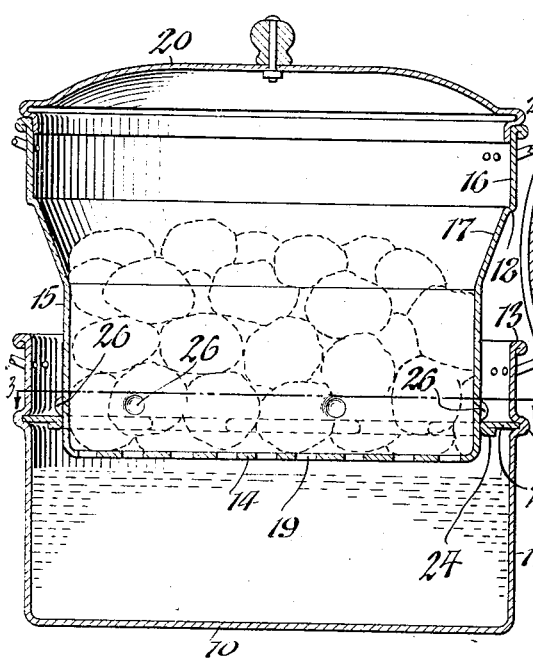
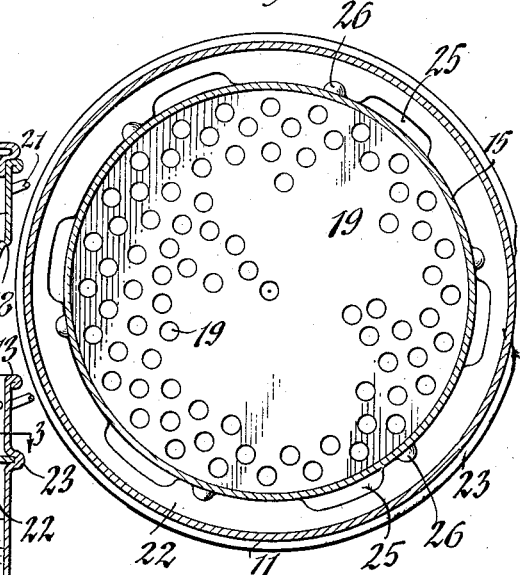
Inventor
Minnie Gertrude Struble
by Popp & Popp
Attorneys Patented Nov. 2, 1937

2,097,478

UNITED STATES PATENT OFFICE 2,097,478

COOKING UTENSIL

Minnie Gertrude Struble, Kenmore, N. Y., assignor to Kettleworth Mfg. Co. Inc., Buffalo, N. Y., a corporation of New York Application October 5, 1936, Serial No. 103,957

5 Claims. (Cl. 53—2)

This invention relates to a cooking utensil which is more particularly designed for cooking materials for food by transmitting the heat from the heating medium through a body of water to the material to be cooked in order to prevent burning of said material.

One of the objects of this invention is to provide a cooking utensil of this character which permits of cooking material by interposing a body of water between the same and the heating medium and also enables the material after being cooked to be supported in such a position that the same is out of contact with the heat transmitting water and the latter is allowed to drain from the cooked material.

Another purpose of this invention is to so construct the cooking utensil that the same can be quickly and easily converted for cooking food or other articles and for draining the water from said articles after the same have been cooked without requiring any extra parts for this purpose.

A further object of this invention is to provide a utensil of this character which is of simple, strong and durable construction and capable of being produced at comparatively low cost.

In the accompanying drawing:

Fig. 1 is a vertical section of the cooking utensil embodying my invention and showing the parts in the position which they occupy when cooking food and the like.

Fig. 2 is a similar view showing the parts of the same in the position which they assume when they have been shifted to effect draining of the water from the articles after the same have been cooked.

In the following description similar characters of reference indicate like parts in the several figures of the drawing.

In its general organization this cooking utensil comprises an outer vessel adapted to be heated on its exterior by any suitable heating medium and an inner vessel which is adapted to receive the material to be cooked and to which the heat from the heating medium is transmitted by a body of water.

The outer vessel is preferably constructed from a single sheet of metal so as to form a horizontal bottom 10, and an upright cylindrical wall 11 rising from the edge of the bottom. For convenience in handling this outer vessel the same is provided on diametrically opposite outer sides of its upper part with handles 12 having the form of loops which may be attached thereto in any suitable manner. At its upper edge the wall of the outer vessel is provided with a curl or turn 13 which forms an annular seat for a purpose which will presently appear.

The inner vessel is also preferably constructed from a single sheet of metal so as to form a horizontal bottom 14, and an upright wall consisting of a lower cylindrical part 15 of comparatively small diameter rising from the edge of the bottom 14, an upper cylindrical part 16 of comparatively large diameter and a downwardly tapering intermediate part 17 extending from the lower edge of the upper large part 16 to the upper edge of the small lower part of this wall.

The inner vessel is movable vertically within the outer vessel and its upper large part 16 is preferably of the same diameter as the wall 11 of the outer vessel while its lower small part 15 is of smaller diameter than the wall 11 of the outer vessel. At the junction of the lower end of the large upper part 16 and the upper end of the tapering intermediate part 17 of the wall of the inner vessel the latter is provided with an annular downwardly facing seat 18 which, in the lowered position of the inner vessel, bears against the seat 13 on the wall of the outer vessel, as shown in Fig. 1, and thereby supports the inner vessel so that its bottom is spaced from the bottom of the outer vessel and the lower cylindrical and intermediate tapering part of the inner vessel are spaced from the wall of the outer vessel. When thus assembled an intervening space is formed between the bottoms and walls of the inner and outer vessels which is adapted to contain water or the like for transmitting the heat which is applied to the exterior of the outer vessel by any suitable heating medium to the material which is to be cooked within the inner vessel. For the purpose of permitting the heating liquid to come into direct contact, communication is established between the interiors of the inner and outer vessels, preferably by providing the bottom of the inner vessel with perforations 19.

During the cooking operation the water space between the inner and outer vessels is closed at the top by engagement of the seats 18 and 13 of these vessels and the heat is also confined in the inner vessel by a lid 20 which removably engages the upper edge of the wall of the inner vessel to permit of introducing the articles to be cooked into the inner vessel and removing the same therefrom. Raising and lowering of the inner vessel may be effected in any suitable manner but preferably by handles 21 arranged above the handles 12 of the outer vessel, whereby both vessels can be manipulated at the same time when desired.

Means are provided whereby the inner vessel may be held in an elevated position relative to the outer vessel for the purpose of draining the water or other liquid from the inner vessel into the outer vessel and thus freeing from the water the articles within the inner vessel after the cooking operation has been completed. The preferred means for this purpose are constructed as follows:—

The numeral 22 represents a supporting ring arranged within the outer vessel between the lower and upper edges of its wall and opposite the lower part of the inner vessel. This ring may be mounted on the wall of the outer vessel in various ways, but this is preferably accomplished by forming on the wall of the outer vessel an annular bead 23 which produces an inwardly opening annular channel and securing the outer edge of this ring in said channel by squeezing the sides of this bead together so that the supporting ring is clamped between them and held securely in place. The inner edge of the supporting ring 23 is preferably curled or turned downwardly to provide a rounded surface, as shown at 24 and this edge is of substantially the same diameter as the periphery of the small lower part of the inner vessel.

At one or more places in the inner edge of the supporting ring, for example six places as shown in Fig. 3, the same is provided with notches 25 which are arranged equidistant around the ring.

On the exterior of the small lower cylindrical part of the inner vessel the same is provided with one or more outward projections 26, for example six in number, which are spaced equidistant similar to the notches of the supporting ring. The projections are preferably formed by displacing or pushing laterally outward parts of the stock of the sheet of metal which forms the wall of the inner vessel.

When it is desired to lower the inner vessel in the outer vessel the inner vessel is first turned about its vertical axis so that the projections 26 register with the notches. The inner vessel may now be lowered from the elevated position shown in Fig. 2 to the depressed position shown in Fig. 1, and during this movement the projections pass downwardly through the notches and into the space below the ring until the seat 18 of the inner vessel rests on the seat 13 of the outer vessel whereby the top of the water space between the walls of the vessels is closed and water passes from this space through the openings 19 into the inner vessel.

Upon now heating the exterior of the outer vessel this heat will be transmitted by the water to the food or other material in the inner vessel without liability of burning this material.

After the cooking has been completed the inner vessel is raised while its projections 26 are in line with the notches 25 of the supporting ring whereby these projections pass upwardly through these notches. When these projections have reached an elevation above this ring the upper vessel is turned about its vertical axis a sufficient extent to bring the projections out of line with the notches 25 and over a solid part of the supporting ring, as shown in Fig. 3. Upon thereafter lowering the inner vessel its projections 26 will rest on the inner edge portion of the supporting ring and sustain the inner vessel in an elevated position, as shown in Fig. 2. The water in the inner vessel will now drain out through the openings 19 therein into the outer vessel and leave the cooked contents within the inner vessel practically dry.

The cooking and draining of the food or the like can thus be effected by the same utensil thereby facilitating these operations and economizing labor and space as compared with the means heretofore employed for this purpose.

By tapering the intermediate part of the inner vessel downwardly the same serves as a guide for readily centering the inner vessel in the outer vessel and properly engaging the seats 18 and 13 thereof to produce a tight joint therebetween which will prevent the escape of steam at this place during the cooking operation.

This invention provides a utensil whereby cooking of food or the like may be first effected by hot water and steam and thereafter self-draining of the water from the cooked material may be effected while the utensil is still resting on the stove or other heating agent, thereby reducing the labor of cooking and permitting this work to be accomplished easily and conveniently and without carrying the utensil from one place to another when successive cooking and draining are necessary.

It is also possible after the cooking by water of the food or other articles in the inner vessel has been completed to simply raise the latter and continue the steaming or heating of this material if desired for the purpose of keeping the same hot or for any other desired purpose.

I claim as my invention:—

1. A cooking utensil comprising an outer lower imperforate vessel adapted to contain a heating liquid, and an inner upper vessel movable vertically in said outer vessel and having perforations in its lower part, the lower part of said inner vessel being of comparatively small diameter and the upper part thereof being of relatively large diameter and forming an annular shoulder at the lower end of the upper large diameter part which is adapted to engage the upper edge of the wall of said outer vessel for supporting the inner vessel in a position in which its bottom is spaced from the bottom of said outer vessel and the wall of said outer vessel and the small lower part of said inner vessel being provided with cooperating surfaces for supporting said inner vessel in an elevated position in which the shoulder of said inner vessel is raised out of engagement from the upper edge of the wall of said outer vessel and the bottom of the inner vessel is lifted a greater distance from the bottom of the outer vessel.

2. A cooking utensil comprising an outer lower imperforate vessel adapted to contain a heating liquid, and an inner upper vessel movable vertically in said outer vessel and having perforations in its lower part, the lower part of said inner vessel being of comparatively small diameter and the upper part thereof being of relatively large diameter and forming an annular shoulder adapted to engage the upper edge of the wall of said outer vessel for supporting the inner vessel in a position in which its bottom is spaced from the bottom of said outer vessel, a supporting ring mounted on the inner side of the wall of said outer vessel and provided on its inner edge with a notch, and an external projection arranged on the wall of the small part of the inner vessel and adapted to pass through said notch to permit the inner vessel to be lowered and rest with its annular shoulder on the wall of the outer vessel and said projection being also adapted to rest on said ring for holding said inner vessel in an elevated position relative to said outer vessel.

3. A cooking utensil comprising an outer lower imperforate vessel adapted to contain a heating liquid, and an inner upper vessel movable vertically in said outer vessel and having perforations in its lower part, the lower part of said inner vessel being of comparatively small diameter and the upper part thereof being of relatively large diameter and forming an annular shoulder adapted to engage the upper edge of the wall of said outer vessel for supporting the inner vessel in a position in which its bottom is spaced from the bottom of said outer vessel, the wall of said outer vessel being provided with an annular bead forming an inwardly opening annular channel, a supporting ring having its outer edge secured in said channel and its inner edge provided with a notch, and a lateral projection arranged on the small part of the wall of said inner vessel and adapted to pass downwardly through said notch to permit the inner vessel to be lowered and rest with its shoulder on the wall of the outer vessel and said projection being also adapted to rest on said ring for holding the inner vessel in an elevated position.

4. A cooking utensil comprising an outer lower imperforate vessel adapted to contain a heating liquid, and an inner upper vessel movable vertically in said outer vessel and having perforations in its lower part, the lower part of said inner vessel being of comparatively small diameter and the upper part thereof being of relatively large diameter and forming an annular shoulder adapted to engage the upper edge of the wall of said outer vessel for supporting the inner vessel in a position in which its bottom is spaced from the bottom of said outer vessel, the wall of said outer vessel being provided with an annular bead forming an inwardly opening annular channel, a supporting ring having its outer edge secured in said channel and its inner edge provided with a notch, and a lateral projection arranged on the small part of the wall of said inner vessel and adapted to pass downwardly through said notch to permit the inner vessel to be lowered and rest with its shoulder on the wall of the outer vessel and said projection being also adapted to rest on said ring for holding the inner vessel in an elevated position said projection being formed by outwardly displacing a part of the wall of the lower part of said inner vessel.

5. A cooking utensil comprising an outer lower imperforate vessel adapted to contain a heating liquid, and an inner upper vessel movable vertically in said outer vessel and having perforations in its lower part, the lower part of said inner vessel being of comparatively small diameter and the upper part thereof being of relatively large diameter and forming an annular shoulder adapted to engage the upper edge of the wall of said outer vessel for supporting the inner vessel in a position in which its bottom is spaced from the bottom of said outer vessel, the wall of said outer vessel being provided with an annular bead forming an inwardly opening annular channel, a supporting ring having its outer edge secured in said channel and its inner edge provided with a notch, and a lateral projection arranged on the small part of the wall of said inner vessel and adapted to pass downwardly through said notch to permit the inner vessel to be lowered and rest with its shoulder on the wall of the outer vessel and said projection being also adapted to rest on said ring for holding the inner vessel in an elevated position, the intermediate part of said inner vessel being of downwardly tapering form and extending from said ring to the upper edge of the outer vessel when said inner vessel is in its lowermost position.

MINNIE GERTRUDE STRUBLE.